(12) United States Patent
Hyun et al.

(10) Patent No.: US 11,914,427 B2
(45) Date of Patent: Feb. 27, 2024

(54) APPARATUS FOR STANDING OF COMPUTER

(71) Applicant: Spigen Korea Co., Ltd., Seoul (KR)

(72) Inventors: Chang Hoon Hyun, Seoul (KR); Jae Hong Cho, Seoul (KR)

(73) Assignee: Spigen Korea Co., Ltd., Seoul (KR)

( * ) Notice: Subject to any disclaimer, the term of this patent is extended or adjusted under 35 U.S.C. 154(b) by 0 days.

(21) Appl. No.: 18/169,546

(22) Filed: Feb. 15, 2023

(65) Prior Publication Data

US 2024/0028081 A1 Jan. 25, 2024

Related U.S. Application Data

(63) Continuation-in-part of application No. 29/865,410, filed on Jul. 25, 2022.

(30) Foreign Application Priority Data

Jan. 25, 2023 (KR) .......................... 10-2023-0009660

(51) Int. Cl.
*G06F 1/16* (2006.01)

(52) U.S. Cl.
CPC .......... *G06F 1/1656* (2013.01); *G06F 1/1632* (2013.01)

(58) Field of Classification Search
CPC ................................................... G06F 1/1632
See application file for complete search history.

(56) References Cited

U.S. PATENT DOCUMENTS

| | | | | |
|---|---|---|---|---|
| 5,862,037 A * | 1/1999 | Behl | ........................ | G06F 1/203 |
| | | | | 361/679.48 |
| 6,542,360 B2 * | 4/2003 | Koizumi | ................. | G06F 1/203 |
| | | | | 361/689 |
| 8,000,099 B2 * | 8/2011 | Parker | ..................... | G06F 1/203 |
| | | | | 361/679.48 |
| 8,619,419 B2 * | 12/2013 | Zimmermann | ....... | G06F 1/1632 |
| | | | | 361/679.48 |

(Continued)

FOREIGN PATENT DOCUMENTS

KR   10-2012-0125019 A   11/2012
KR   10-2013-0001057 A   1/2013

(Continued)

OTHER PUBLICATIONS

Cliffstoll, "A homebrew dust filter for the mac studio", https://www.reddit.com/r/MacStudio/comments/vzbtre/a_homebrew_dust_filter_for_the_mac_studio, Jul. 14, 2022.

(Continued)

*Primary Examiner* — Lisa Lea-Edmonds
(74) *Attorney, Agent, or Firm* — Bridgeway IP Law Group, PLLC; Jihun Kim

(57) ABSTRACT

A cradle device for a computer according to an embodiment includes: a cradle part configured such that the inlet part is seated thereon and holes through which air flows are formed therein; a filter part configured to filter out foreign substances generated according to the flow of air; and a filter housing part configured such that the filter part is coupled to a top surface thereof, and fixedly coupled below the holes of the cradle part. The filter part includes a first filter part made of a mesh material, and filters out foreign substances through the first filter part before air is introduced into the inlet part.

3 Claims, 20 Drawing Sheets

(56) References Cited

U.S. PATENT DOCUMENTS

| | | | | |
|---|---|---|---|---|
| 8,926,414 | B1* | 1/2015 | Kirkpatrick | G06F 1/203 |
| | | | | 361/679.41 |
| 9,395,773 | B1* | 7/2016 | Huang | G06F 1/203 |
| 9,990,002 | B2* | 6/2018 | Kim | G07F 17/32 |
| 10,838,465 | B2* | 11/2020 | Lee | G06F 1/203 |
| 11,347,285 | B2* | 5/2022 | Casparian | G06F 1/1632 |
| 11,547,015 | B2* | 1/2023 | Zhong | G06F 1/203 |
| 11,755,081 | B2* | 9/2023 | Casparian | G06F 1/1632 |
| | | | | 165/80.2 |
| 2009/0154089 | A1* | 6/2009 | Seo | G06F 1/203 |
| | | | | 361/679.48 |
| 2010/0065258 | A1* | 3/2010 | Blomquist | F28F 3/048 |
| | | | | 165/104.34 |
| 2010/0079945 | A1* | 4/2010 | Wang | G06F 1/203 |
| | | | | 361/695 |
| 2010/0134976 | A1* | 6/2010 | Kuo | G06F 1/1632 |
| | | | | 361/695 |
| 2010/0186928 | A1* | 7/2010 | Chen | G06F 1/203 |
| | | | | 165/67 |
| 2010/0226088 | A1* | 9/2010 | Huang | G06F 1/203 |
| | | | | 361/679.48 |
| 2010/0288902 | A1* | 11/2010 | Liu | G06F 1/203 |
| | | | | 248/349.1 |
| 2014/0281579 | A1* | 9/2014 | Trachtenberg | G06F 1/1637 |
| | | | | 713/189 |
| 2022/0377932 | A1* | 11/2022 | Zhong | G06F 1/166 |
| 2023/0168725 | A1* | 6/2023 | Hill | G06F 1/203 |
| | | | | 700/300 |

FOREIGN PATENT DOCUMENTS

| | | |
|---|---|---|
| KR | 10-2017-0141395 A | 12/2017 |
| KR | 10-2019-0027160 A | 3/2019 |
| KR | 10-2172714 B1 | 11/2020 |
| KR | 10-2022-0057952 A | 5/2022 |

OTHER PUBLICATIONS

Mark Sparrow, "Review: Satechi USB Stand Is Perfect For Apple's M1 Mac Mini", https://www.forbes.com/sites/marksparrow/2021/07/19/review-satechi-usb-stand-is-perfect-for-apples-m1-mac-mini/?sh=72fbbc514714, Jul. 19, 2021.

* cited by examiner

| Device Heat Generation Tests for Individual Filters |||
|---|---|---|
| Test Purpose, Method, and Criteria | Program Used | Test Environment |
| Specified in the description | Cinebench, Macs Fan Control, iStat Menus | |

No Stand conventional PVC type filter

PVC + Mesh Type filter

APPARATUS FOR STANDING OF COMPUTER

CROSS-REFERENCE TO RELATED APPLICATION

This application is a continuation-in-part application of the U.S. Design Application Ser. No. 29/865,410, filed on Jul. 25, 2022, which is incorporated herein by reference in its entirety, and claims priority from Korean Patent Application No. 10-2023-0009660, filed on Jan. 25, 2023, in Korean Intellectual Property Office.

BACKGROUND

1. Technical Field

The present invention relates to a cradle device for a computer that is capable of efficiently preventing the inflow of dust while seating a computer thereon.

2. Description of the Related Art

In life today, personal computers (hereinafter referred to as computers) are devices that are widely used not only for work but also for everyday life. In recent years, computers the sizes of which have been drastically reduced have been released by individual brands. In the case of such computers, the internal design thereof is designed in a unique form for each brand in order to drastically reduce the size of the computers and increase the efficiency of the computers.

However, the main problem with these computers is heat generation. Each brand designs and operates a cooling system inside computers in order to solve this heat generation problem. In particular, recently, in the case of computers of a specific brand, a configuration in which air is sucked from the bottom of a computer to prevent heat generation has been disclosed, and thus the heat generation problem seems to have been solved in general.

However, there is a problem that reoccurs while applying a cooling system to solve heat generation in a computer, which is the inflow of foreign substances such as dust. In particular, when a computer is operated for a long period of time, airflow is generated as the internal cooling system continuously operates. As a result, foreign substances or dust are introduced into the computer, causing the erroneous operation of the computer or damage to the computer.

In addition, as the size of computers themselves is reduced and efficiency is maintained, each brand is releasing signature-type computers. In the case of such signature computers, they offer aesthetic pleasures and functional stability to users through advanced materials, finish, and/or design, but they impose a burden on management. In particular, there is required a countermeasure for preventing scratches or abrasions on the exterior of the computer.

In this situation, there is an urgent need for the development of a product for removing foreign substances introduced into a computer while seating the computer thereon.

PRIOR ART LITERATURE

Patent Document (Patent document 1) Korean Patent Application Publication No. 10-2013-0001057 entitled "Computer Stand"

SUMMARY

A cradle device for a computer according to an embodiment of the present invention is intended to provide a cradle device that filters out foreign substances flowing into a computer while seating the computer thereon in order to solve the above problems. In particular, the main purpose of the present applicant is to provide a cradle in the form of an accessory that can be applied to computers released by a specific company having the highest global market share in the computer or mobile field.

According to an embodiment of the present invention, there is provided a cradle device for a computer in which a body part formed in a box shape and having a control unit and a cooling unit disposed therein and an inlet part protruding from a bottom surface of the body part in a circular shape, formed in a ring shape and configured to receive air introduced by the cooling unit are formed, the cradle device including: a cradle part configured such that the inlet part is seated thereon and holes through which air flows are formed therein; a filter part configured to filter out foreign substances generated according to the flow of air; and a filter housing part configured such that the filter part is coupled to the top surface thereof, and fixedly coupled below the holes of the cradle part; wherein the filter part includes a first filter part made of a mesh material, and filters out foreign substances through the first filter part before air is introduced into the inlet part.

Furthermore, the cradle part includes: one or more stand portions extending upward from the ground; a plate-shaped stand connection portion connecting the stand portions, and having a circular opening formed in the center thereof; a circular seating part disposed in the center of the stand connection portion and configured such that the computer is seated thereon; a ring-shaped first outer frame having the length of the outer circumferential surface equal to the length of the inner circumferential surface of the circular opening; a ring-shaped first inner frame having the length of the outer circumferential surface equal to the length of the outer circumferential surface of the seating part; and a grill part having a plurality of bar shapes connecting the first outer frame and the first inner frame; wherein a direction from the first outer frame to the first inner frame is a direction that is disposed to be inclined downward.

Furthermore, the holes are formed by the spaces of the grill part.

Furthermore, the filter housing part includes: a second outer frame coupled to the first outer frame, and formed in a ring shape having a circumference corresponding to the circumference of the first outer frame; a second inner frame coupled to the first inner frame, formed in a ring shape having a circumference corresponding to the circumference of the first inner frame, and disposed below the second outer frame; and reinforcing portions having a plurality of bar shapes connecting the second outer frame and the second inner frame; wherein the filter part is coupled into spaces between the reinforcing portions.

Furthermore, the filter part is made of a PVC material, and further includes a second filter part that is stacked together with the first filter part.

The cradle device for a computer according to the embodiment of the present invention described above has the following effects:

Although the shape is limited to the computer released by a specific brand, there is the effect of completely preventing dust from entering the inside while the cooling system of the computer operates.

Furthermore, the computer may be seated on a desk or at a desired location in a state of being spaced apart from the ground by a set height, so that there is the effect of preventing abrasions or scratches on a main area while revealing the appearance of the computer to the outside.

Furthermore, the filter part is attached to the top surface of the filter housing part, and thus structuring is performed to minimize the exposure of the filter part to the outside and also facilitate the coupling of the filter part, so that there is the effect of reducing the time and cost required in the manufacturing process.

Furthermore, the filter part is configured such that two types of filters, the first filter part and the second filter part, are used in a state in which they are overlapped or stacked on top of the other, so that there is the effect of filtering out both fine dust and large-sized foreign substances, resulting in the effect of increasing the durability of the computer so that it can be used stably.

Moreover, the filter housing part is disposed to be selectively coupled to the cradle part, and thus the filter housing part may be removed from the cradle part and also the coupled filter part may be washed after the elapse of a predetermined period of time, so that there is the effect of economically using the filter part for a long period of time.

DETAILED DESCRIPTION

Embodiments of the present invention will be described in detail with reference to the accompanying drawings so that those of ordinary skill in the art to which the present invention pertains can easily practice the present invention. The present invention may be embodied in various different forms and is not limited to the structures or methods set forth herein.

Figure 1:
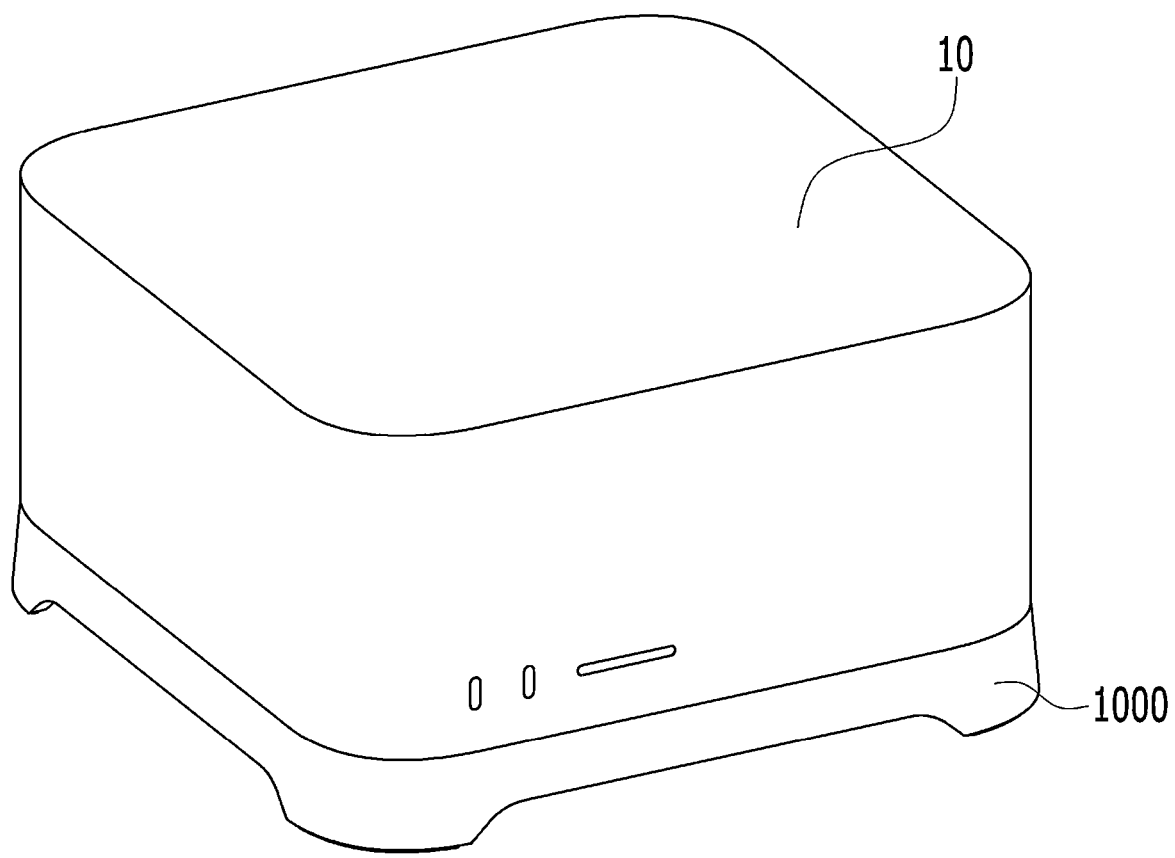
FIG. 1 is a perspective view of a cradle device for a computer and a computer to be seated according to an embodiment of the present invention.
Figure 2:
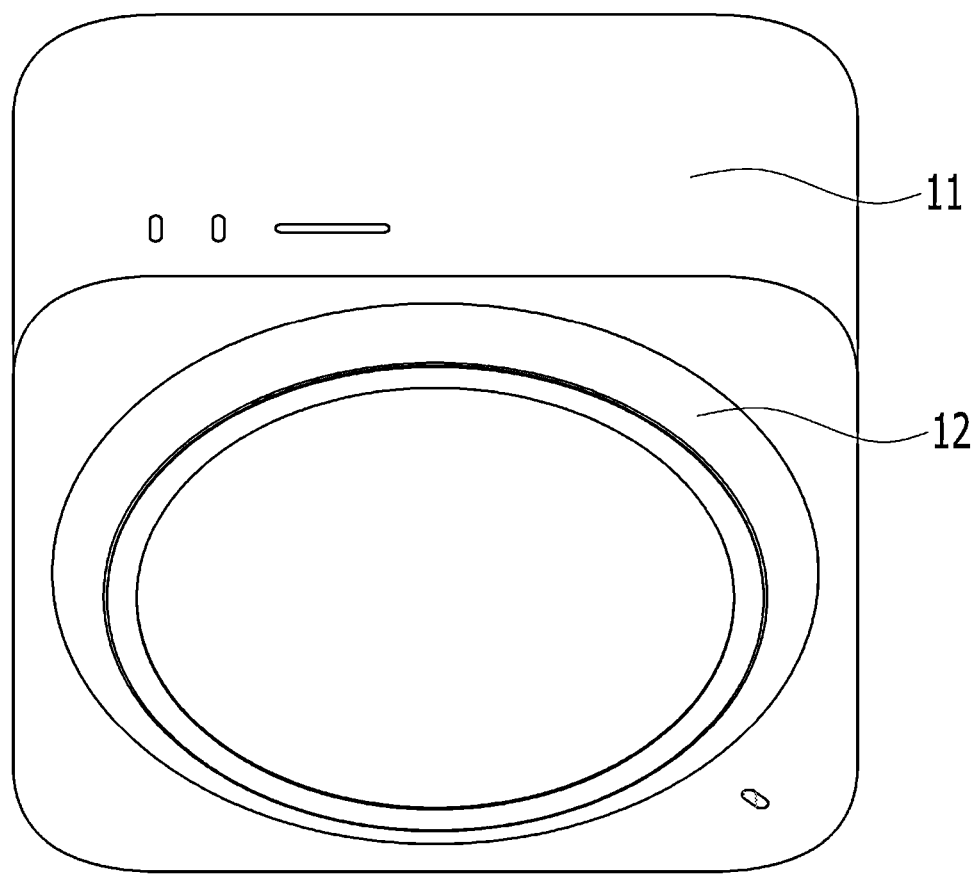
FIG. 2 is a bottom perspective view of the computer that is seated on the cradle device for a computer according to an embodiment of the present invention.

FIG. 1 is a perspective view of a cradle device 1000 for a computer 10 and a computer to be seated according to an embodiment of the present invention, and FIG. 2 is a bottom perspective view of the computer that is seated on the cradle device 1000 for the computer 10 according to the embodiment of the present invention.

Referring to FIGS. 1 and 2, in the computer 10 to be seated on the cradle device 1000 for the computer 10 according to the embodiment of the present invention, a body part 11 having a rectangular box shape and also having a control unit and a cooling unit disposed therein, and a ring-shaped inlet part 12 disposed on the bottom surface of the body part 11, more specifically at the bottom end of the body part 11, and configured to receive the cradle part generated by the cooling unit may be disposed. In this case, the inlet part 12 may be disposed to protrude downward in a ring shape.

Figure 3:
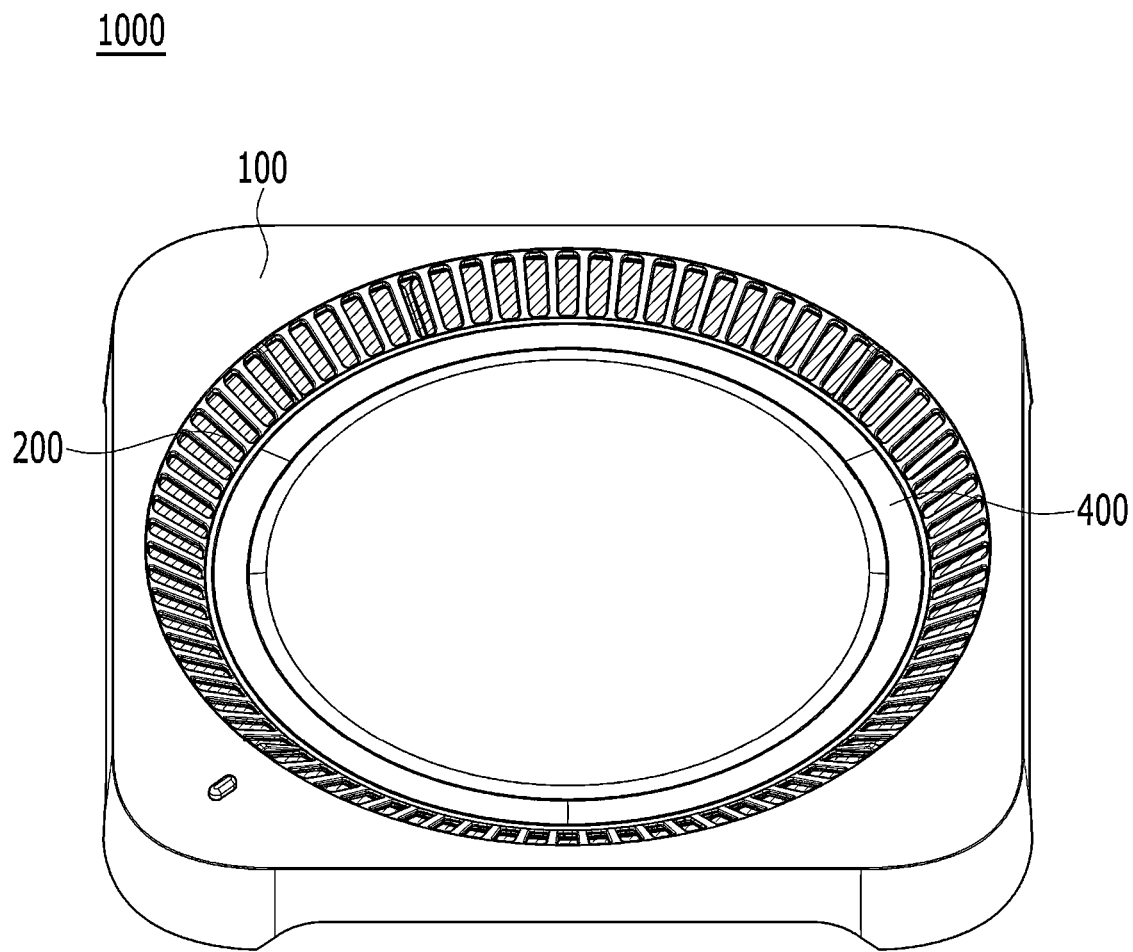
FIG. 3 is a top perspective view of the cradle device for a computer according to the embodiment of the present invention.
Figure 4:
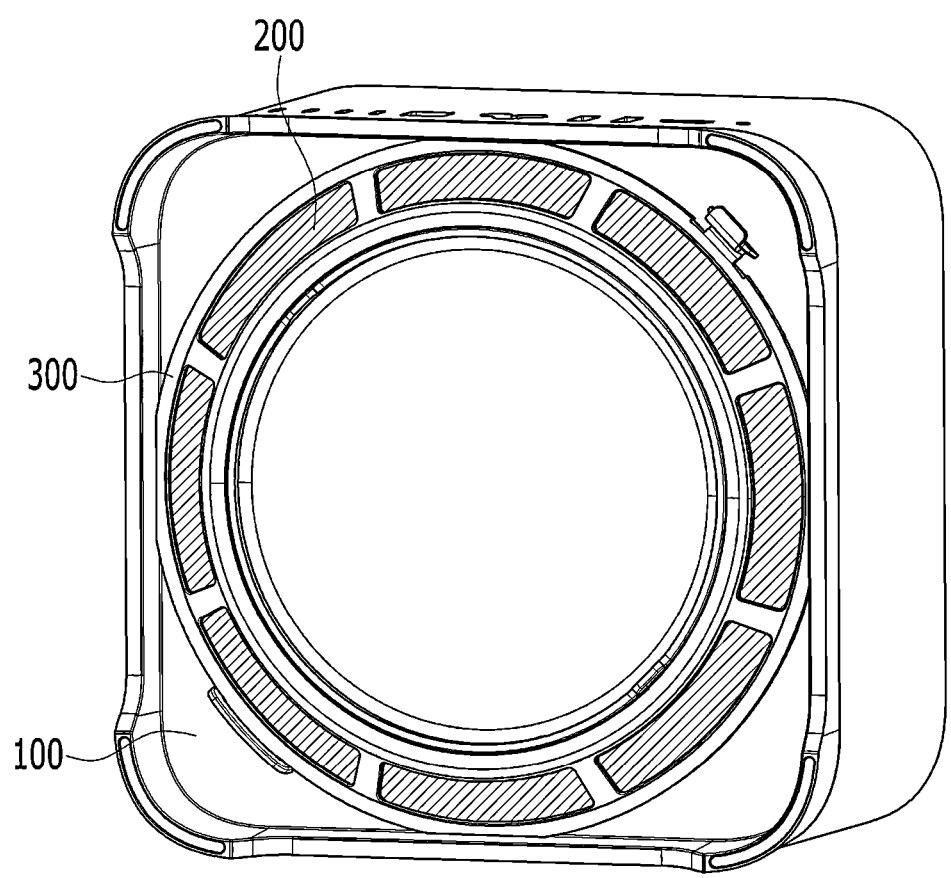
FIG. 4 is a bottom perspective view of the cradle device for a computer according to the embodiment of the present invention.
Figure 5:
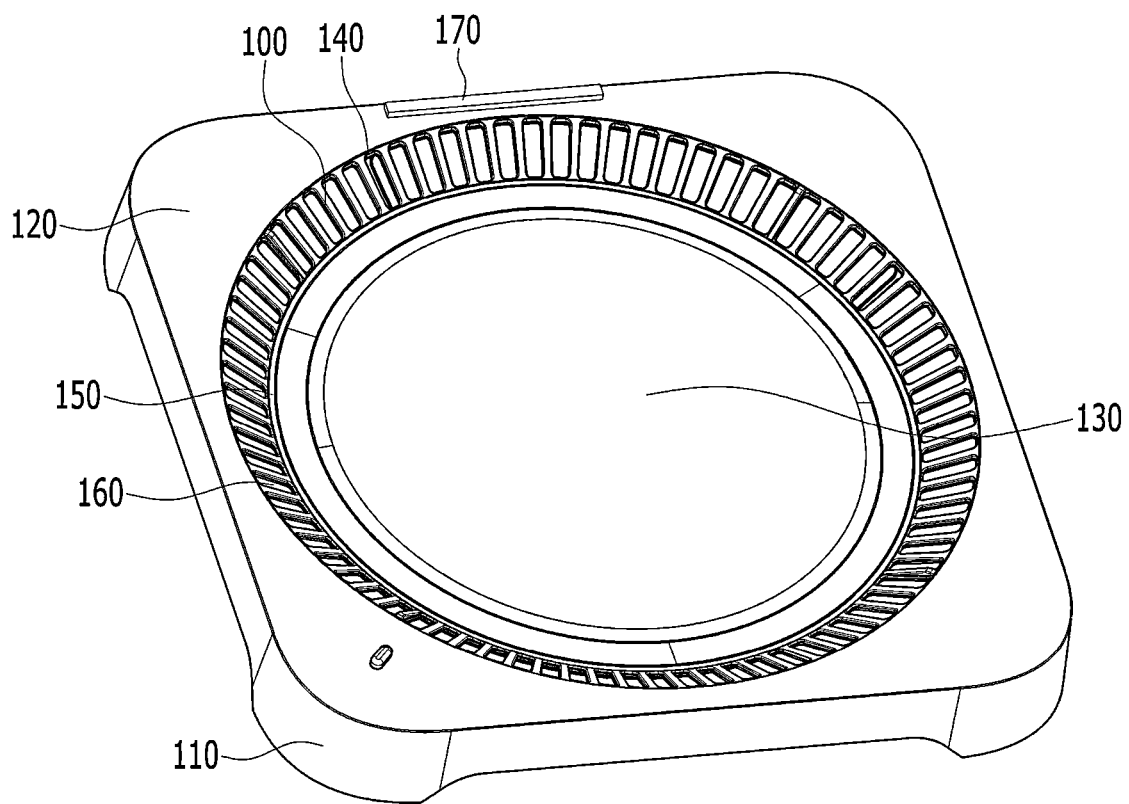
FIG. 5 is a top perspective view of the cradle part of the cradle device for a computer according to the embodiment of the present invention.
Figure 6:
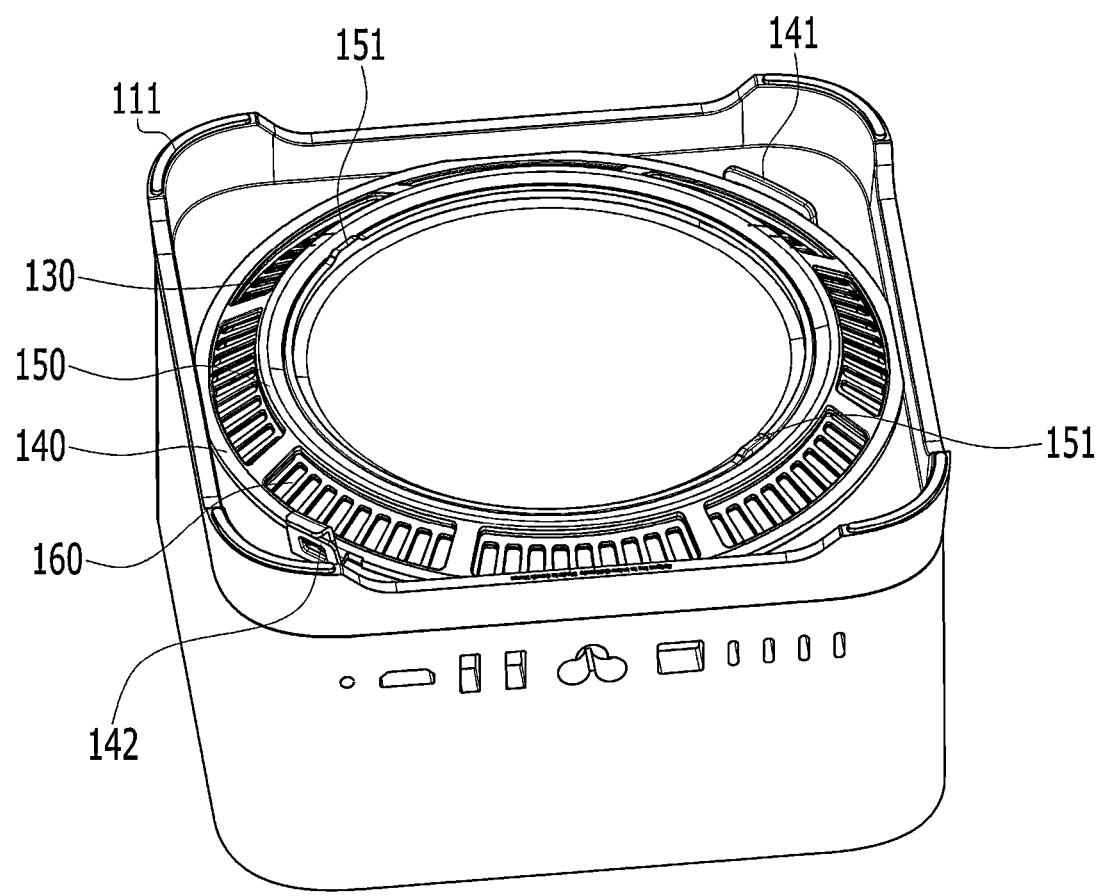
FIG. 6 is a bottom perspective view of the cradle part of the cradle device for a computer according to the embodiment of the present invention.
Figure 7:
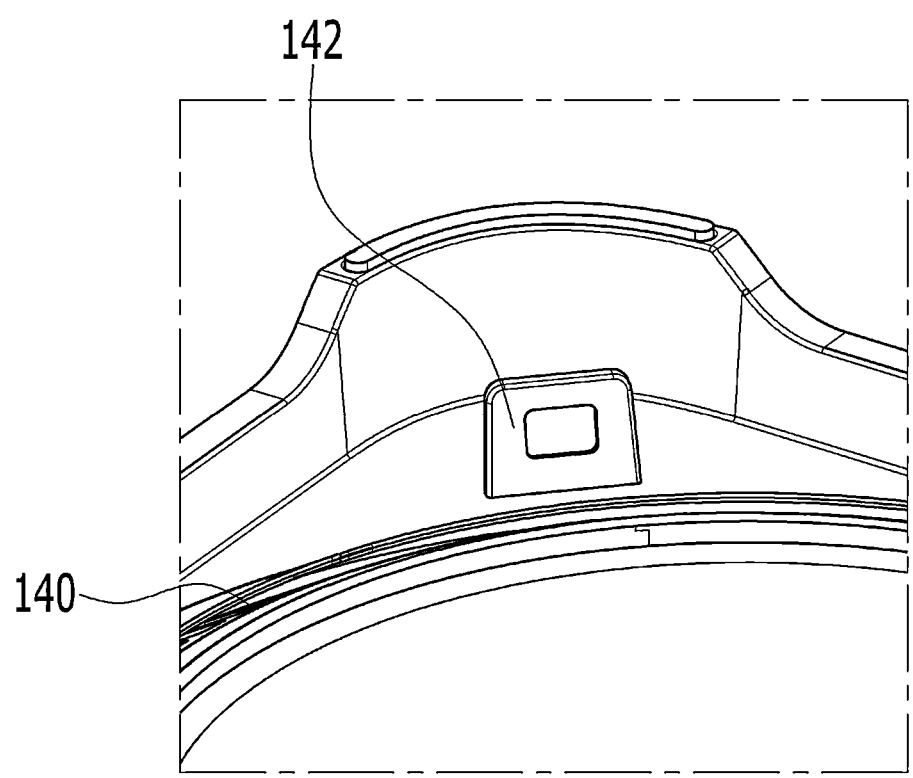
FIG. 7 is a view showing the main tab of the cradle part of the cradle device for a computer according to the embodiment of the present invention.
Figure 8:
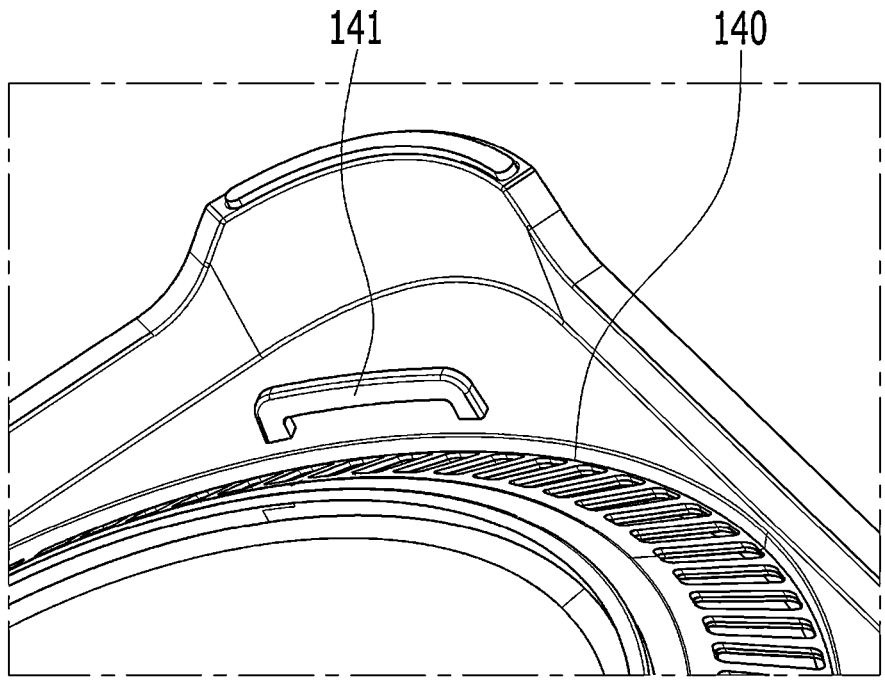
FIG. 8 is a view showing the first auxiliary tab of the cradle part of the cradle device for a computer according to the embodiment of the present invention.
Figure 9:
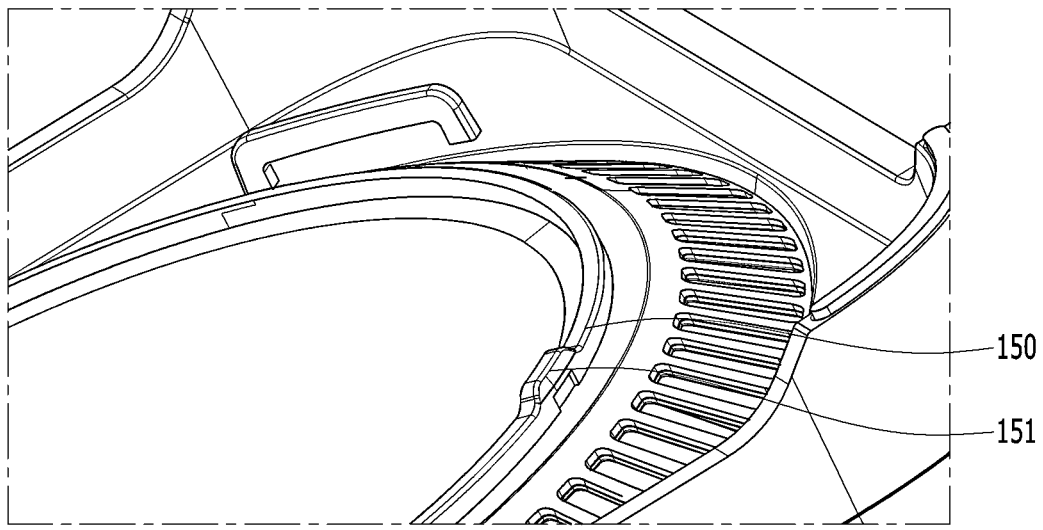
FIG. 9 is a view showing a second auxiliary tab of the cradle part of the cradle device for a computer according to the embodiment of the present invention.
Figure 10A:
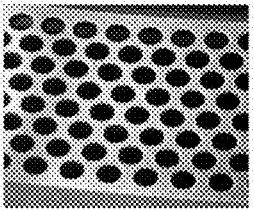
FIGS. 10A-10G are diagrams showing test data for an example using the filter part of the cradle device for a computer according to the embodiment of the present invention and comparative examples.
Figures 10B, 10C:
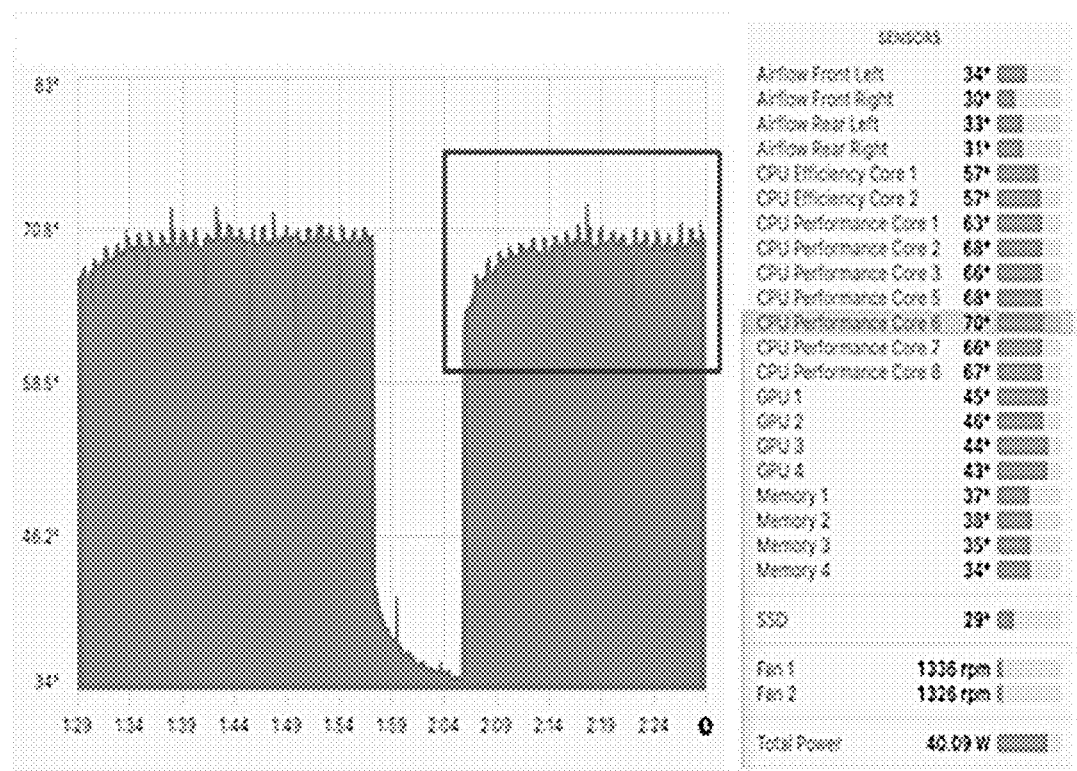
Figure 10D:
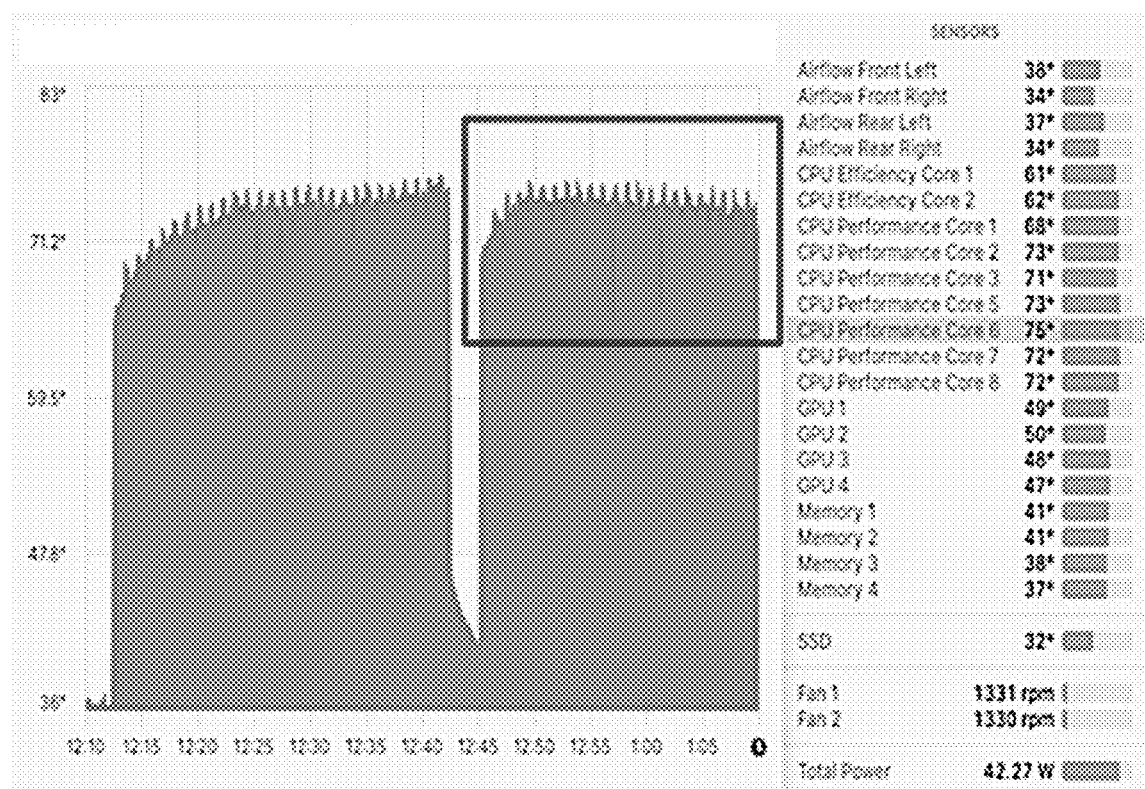
Figure 10E:
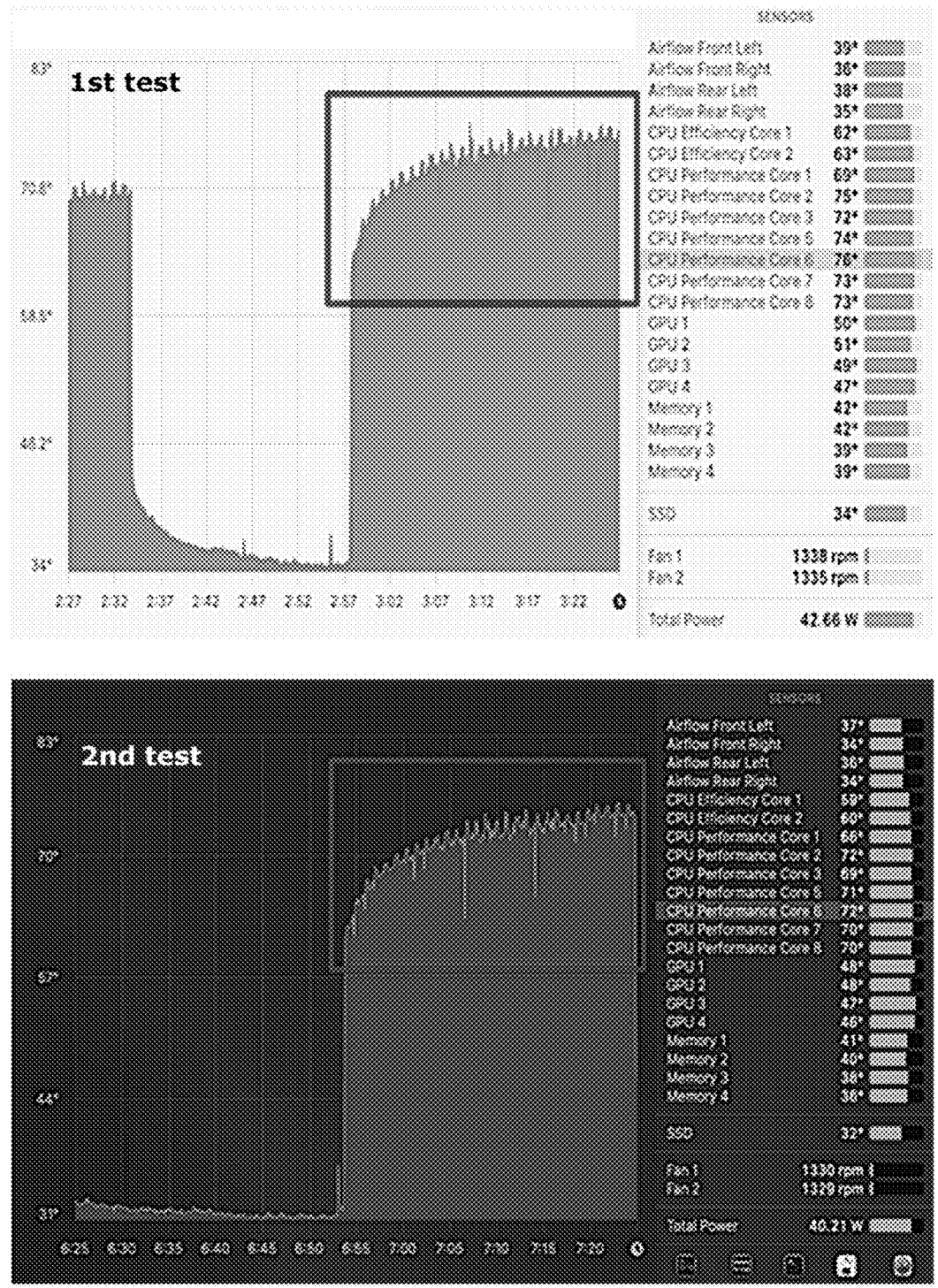
Figure 10F:
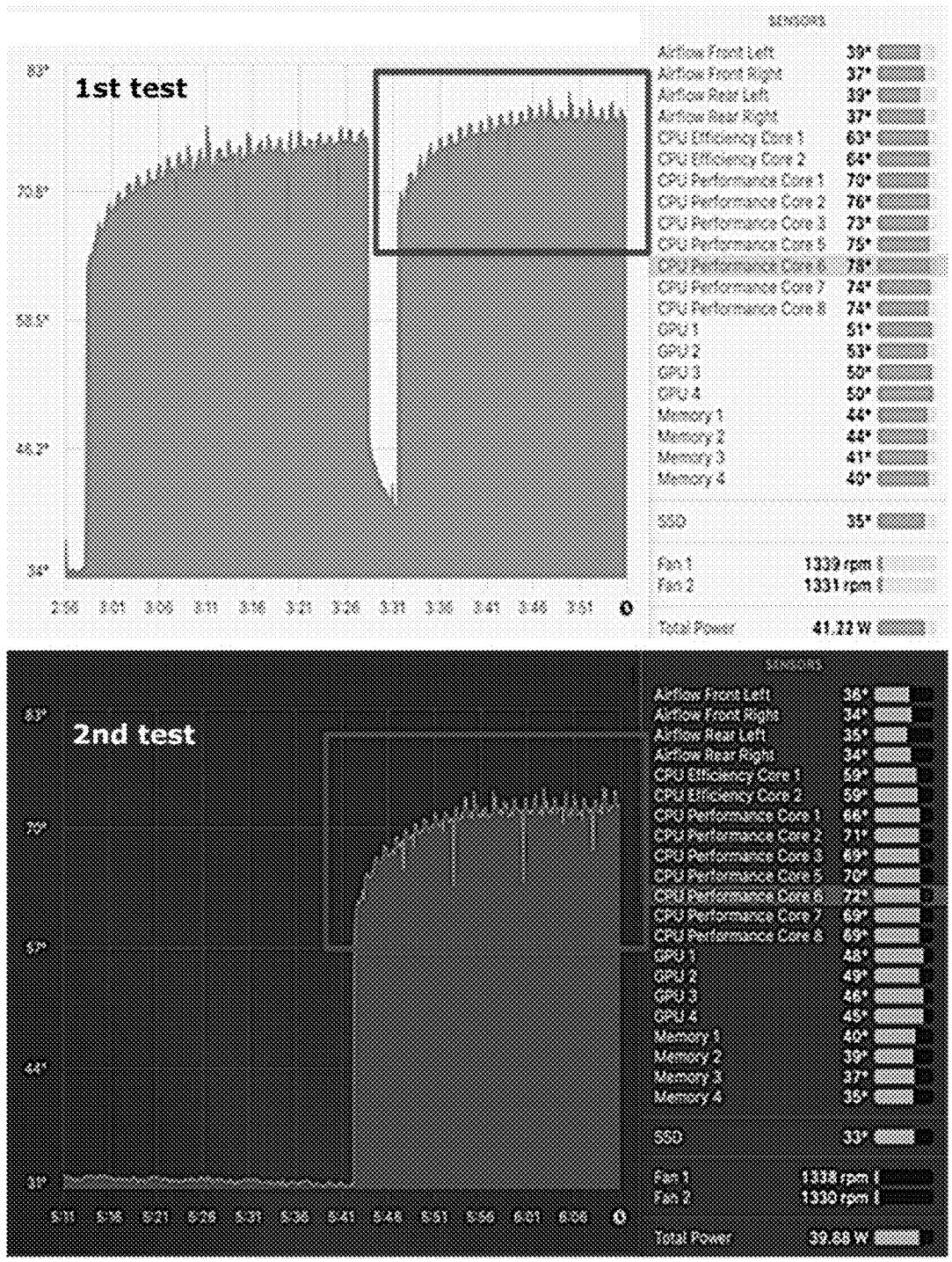
Figure 10G:
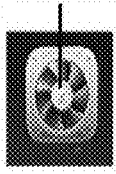
Figure 11:
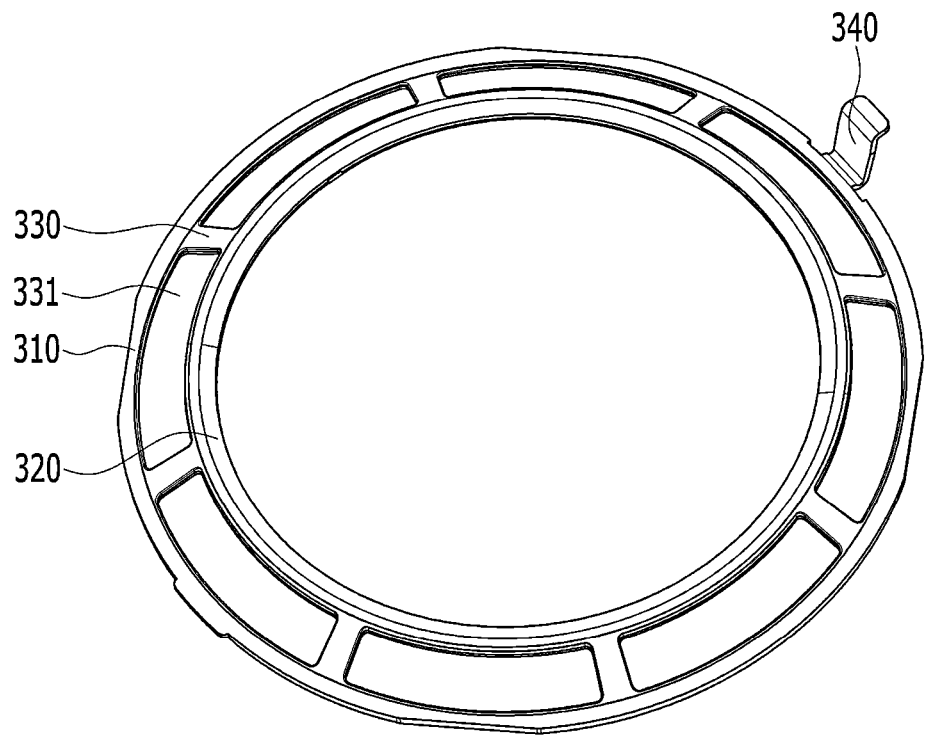
FIG. 11 is a bottom perspective view of the filter housing part of the cradle device for a computer according to the embodiment of the present invention.
Figure 12:
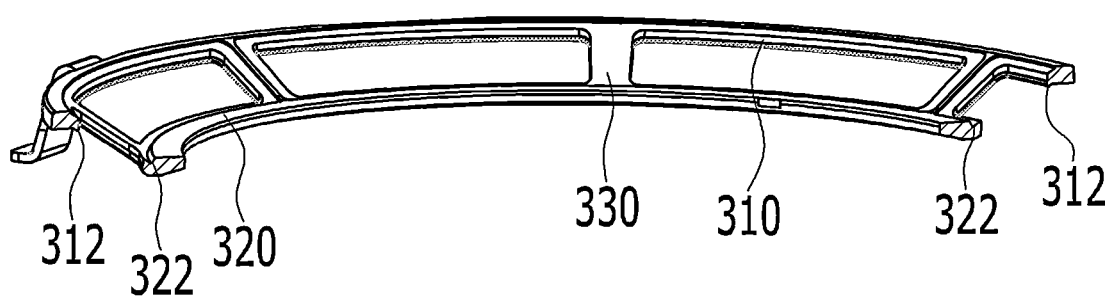
FIG. 12 is a side sectional view of the filter housing part of the cradle device for a computer according to the embodiment of the present invention.
Figure 13:
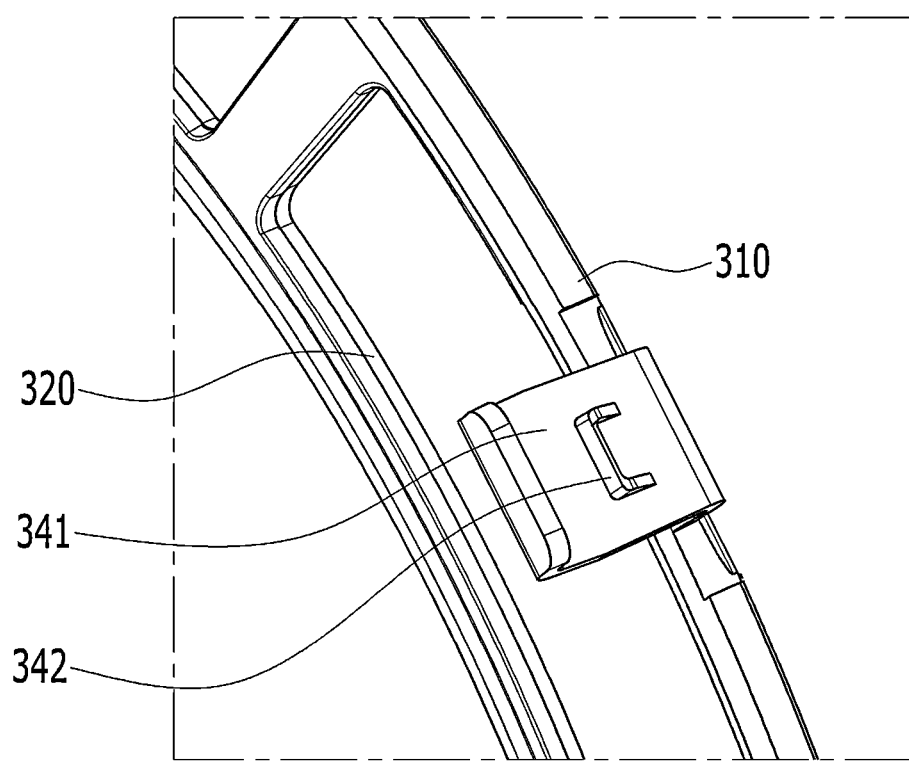
FIG. 13 is a view showing the main hook portion of the filter housing part of the cradle device for a computer according to the embodiment of the present invention.
Figure 14:
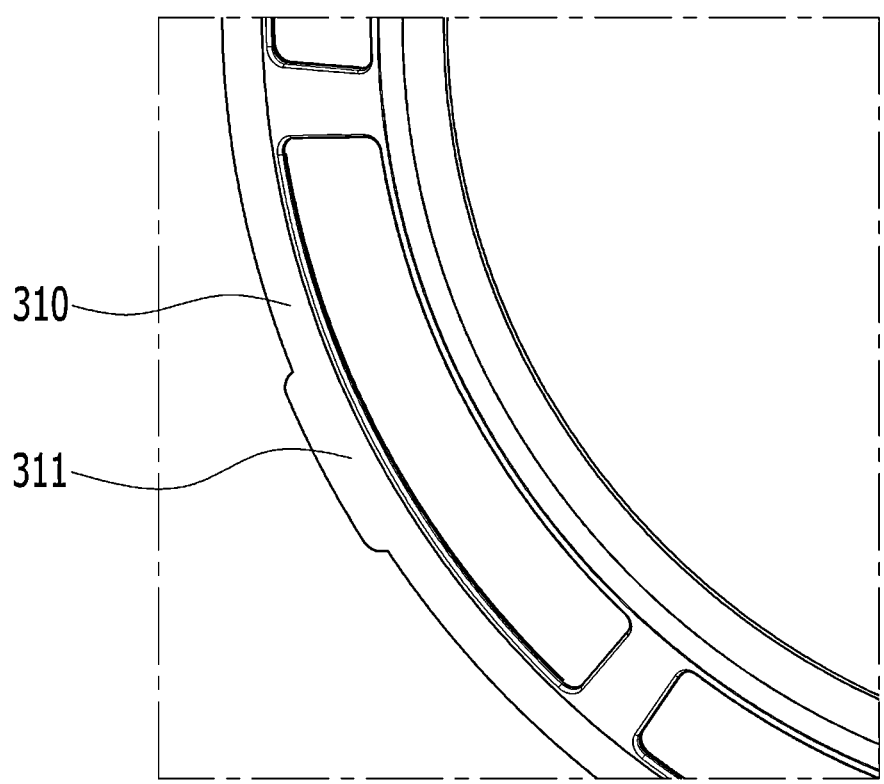
FIG. 14 is a view showing the first auxiliary protrusion 311 of the filter housing part of the cradle device for a computer according to the embodiment of the present invention.
Figure 15:
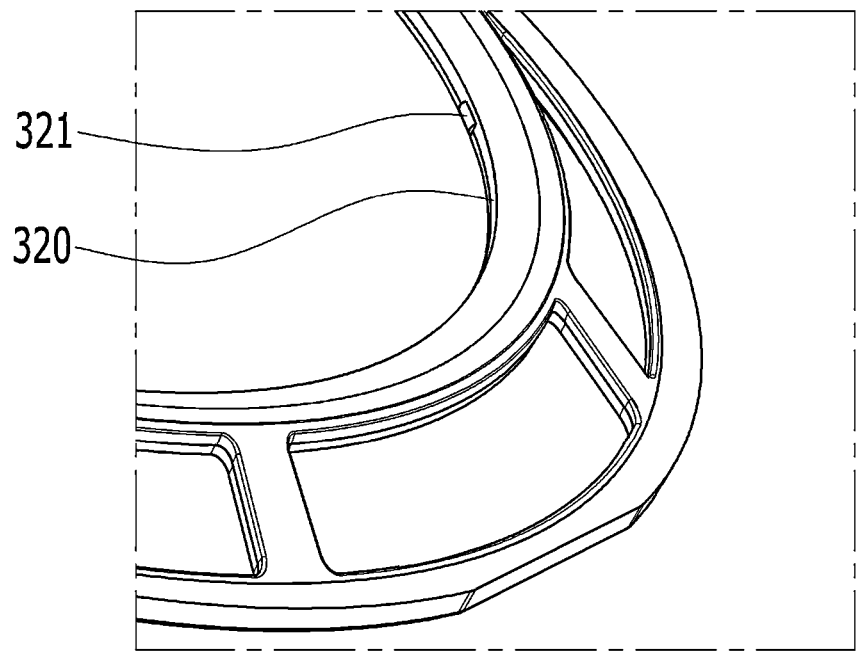
FIG. 15 is a view showing the second auxiliary protrusion of the filter housing part of the cradle device for a computer according to the embodiment of the present invention.
Figure 16:
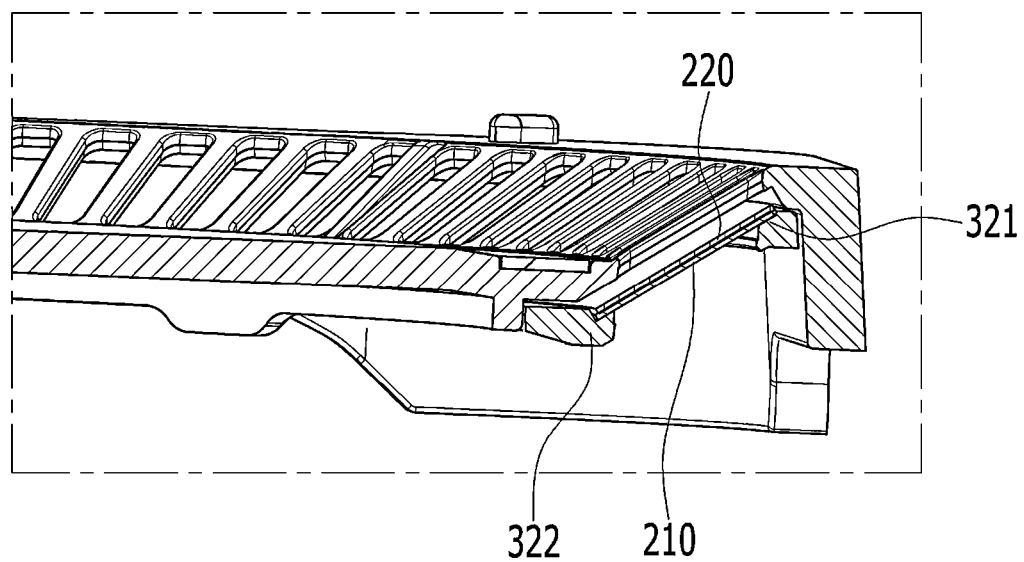
FIG. 16 is a side sectional view showing the coupling relationship between the filter housing part and filter part of the cradle device for a computer according to the embodiment of the present invention.
Figure 17:
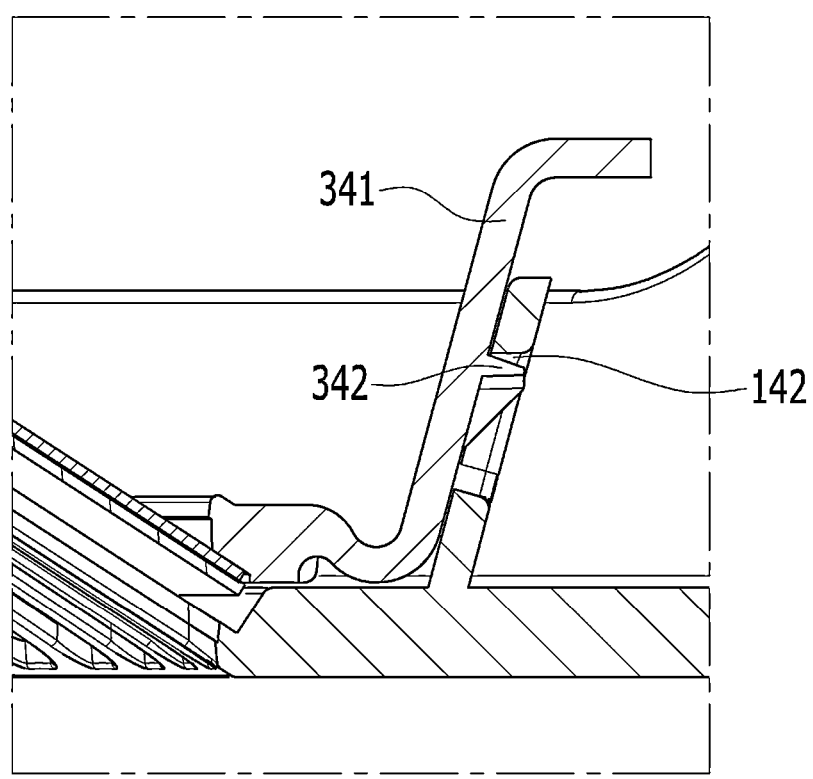
FIG. 17 is a side section view showing the coupling relationship between the main tab and main hook portion of the cradle device for a computer according to the embodiment of the present invention.
Figure 18:
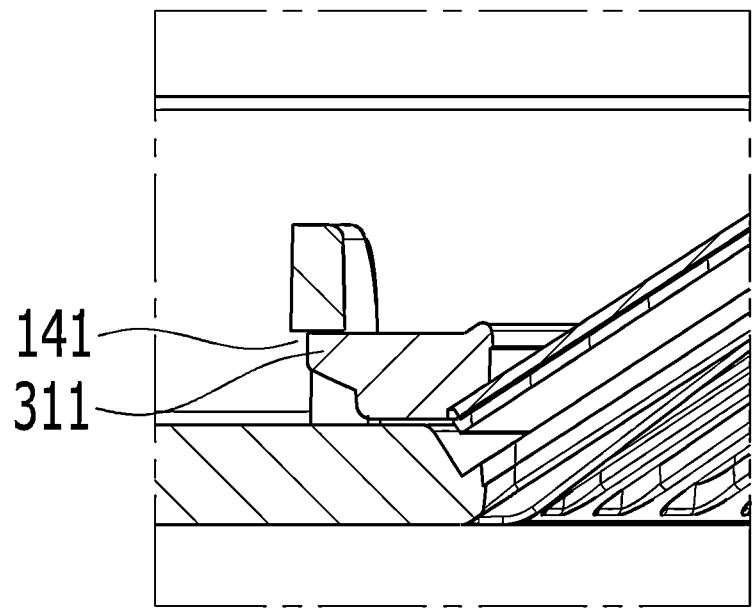
FIG. 18 is a side sectional view showing the coupling relationship between the first auxiliary tab and first auxiliary protrusion of the cradle device for a computer according to the embodiment of the present invention.
Figure 19:
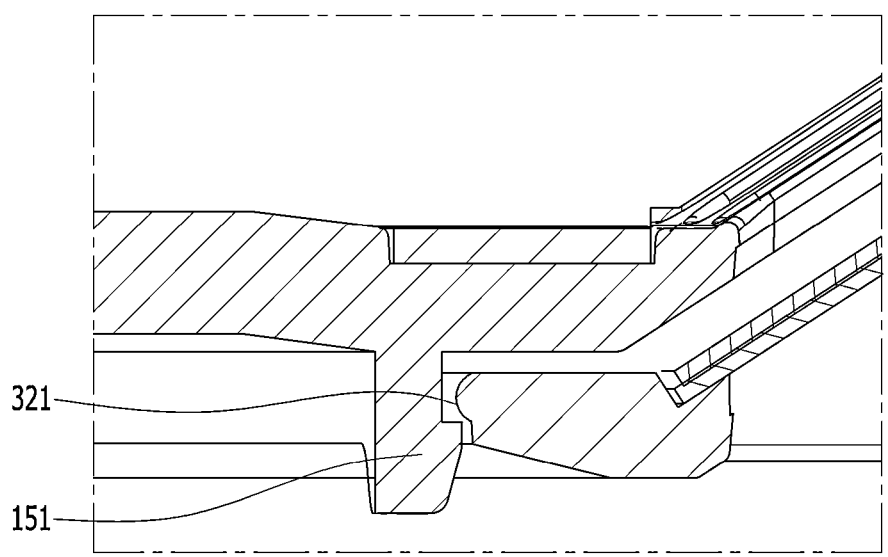
FIG. 19 is a side sectional view showing the coupling relationship between the second auxiliary tab and second auxiliary protrusion of the cradle device for a computer according to the embodiment of the present invention.

FIG. 3 is a top perspective view of the cradle device 1000 for the computer 10 according to the embodiment of the present invention, FIG. 4 is a bottom perspective view of the cradle device 1000 for the computer 10 according to the embodiment of the present invention, FIG. 5 is a top perspective view of the cradle part 100 of the cradle device 1000 for the computer 10 according to the embodiment of the present invention, FIG. 6 is a bottom perspective view of the cradle part 100 of the cradle device 1000 for the computer 10 according to the embodiment of the present invention, FIG. 7 is a view showing the main tab 142 of the cradle part 100 of the cradle device 1000 for the computer 10 according to the embodiment of the present invention, FIG. 8 is a view showing the first auxiliary tab 141 of the cradle part 100 of the cradle device 1000 for the computer 10 according to the embodiment of the present invention, FIG. 9 is a view showing a second auxiliary tab 151 of the cradle part 100 of the cradle device 1000 for the computer according to the embodiment of the present invention, FIGS. 10A-10G are diagrams showing test data for an example using the filter part 200 of the cradle device 1000 for the computer 10 according to the embodiment of the present invention and comparative examples, FIG. 11 is a bottom perspective view of the filter housing part 300 of the cradle device 1000 for the computer 10 according to the embodiment of the present invention, FIG. 12 is a side sectional view of the filter housing part 300 of the cradle device 1000 for the computer 10 according to the embodiment of the present invention, FIG. 13 is a view showing the main hook portion 340 of the filter housing part 300 of the cradle device 1000 for the computer 10 according to the embodiment of the present invention, FIG. 14 is a view showing the first auxiliary protrusion 311 of the filter housing part 300 of the cradle device 1000 for the computer 10 according to the embodiment of the present invention, FIG. 15 is a view showing the second auxiliary protrusion 321 of the filter housing part 300 of the cradle device 1000 for the computer 10 according to the embodiment of the present invention, FIG. 16 is a side sectional view showing the coupling relationship between the filter housing part 300 and filter part 200 of the cradle device 1000 for the computer 10 according to the embodiment of the present invention, FIG. 17 is a side section view showing the coupling relationship between the main tab 142 and main hook portion 340 of the cradle device 1000 for the computer 10 according to the embodiment of the present invention, FIG. 18 is a side sectional view showing the coupling relationship between the first auxiliary tab 141 and first auxiliary protrusion 311 of the cradle device 1000 for the computer 10 according to the embodiment of the present invention, and FIG. 19 is a side sectional view showing the coupling relationship between the second auxiliary tab 151 and second auxiliary protrusion 321 of the cradle device 1000 for the computer 10 according to the embodiment of the present invention.

Referring to FIGS. 1 to 4, the cradle device 1000 for the computer 10 according to the embodiment of the present invention includes: the cradle part 100 configured to provide a seating contact surface for the seating of the computer 10; a filter part 200 configured to filter out dust; the filter housing part 300 disposed to be selectively coupled to the cradle part 100 in a state in which the filter part 200 is coupled thereto; and an anti-slip part 400 disposed on the seating contact surface and configured to prevent the computer 10 from moving.

Referring to FIGS. 5 to 9, the cradle part 100 is a means which allows the bottom surface of the computer 10, more specifically the inlet part 12 of the computer 10, to be seated on the seating contact surface thereof and to which the filter housing part 300 is selectively coupled. In more detail, the cradle part 100 may include: one or more stand portions 110 disposed in four directions, and extending upward from the ground; a stand connection portion 120 formed in a plate shape connecting the stand portions 110, and having a circular opening formed in the center thereof; a circular seating part 130 disposed in the center of the stand connection portion 120, and configured to come into contact with the bottom surface of the computer 10; a first outer frame 140 disposed between the stand connection portion 120 and the seating part 130, arranged to be inclined downward from the outside to the inside in a ring shape, and configured to form the outer side of a ring; a first inner frame 150 configured to form the inner side of the ring; a grill part 160 disposed between the first outer frame 140 and the first inner frame 150, and configured to form one or more holes 161 to be spaced apart by a set interval in the ring extension direction; and a stopper part 170 configured to limit movement so that the computer 10 can be stably placed thereon. In this case, the first outer frame 140 may be integrated with the stand connection portion 120, and the first inner frame 150 may be integrated with the seating part 130. The reason for these divisions is to achieve convenience of description.

The stand portions 110 are means that extend upward from the ground and support the computer and may be disposed below respective corners when the stand connection portion 120 has a rectangular shape. That is, the stand portions 110 are means that serve as the legs of a table generally used for seating. Although they may be formed as curved line shapes as shown in the drawing, they are not limited thereto. They have not limitations in their shape. Furthermore, friction portions 111 having frictional resistance against the floor may be disposed at the bottom ends of the stand portions 110 in order to prevent slip on the ground.

The stand connection portion 120 may be disposed in a plate shape connecting the stand portions 110, and may have a circular opening formed in the center thereof. The circular opening is disposed such that the length of the inner circumferential surface thereof is the same as the length of the outer circumferential surface of the first outer frame 140, so that there can be provided a space for disposing the first outer frame 140, the first inner frame 150, the grill part 160, and the seating part 130 therein.

The seating part 130 may be disposed in a circular plate shape at the center of the stand connection portion 120. In this case, the seating part 130 may have the length of the outer circumferential surface equal to the length of the inner circumferential surface of the first inner frame 150. Accordingly, the seating part 130 is connected to the first inner frame 150 so that the bottom end of the computer 10 can comes into contact therewith and seated thereon.

The first outer frame 140 and the first inner frame 150 are means for forming the holes 161 together with the grill part 160. The first outer frame 140 and the first inner frame 150 may be disposed between the stand connection portion 120 and the seating part 130. In more detail, the first outer frame 140 is a circular frame. As the length of the circumferential surface of the first outer frame 140 is formed to be the same as that of the inner circumferential surface of the stand connection portion 120 and the first outer frame 140 is integrated with the inner circumferential surface of the stand connection portion 120, the second outer frame 310 of the filter housing, which will be described later, may be coupled thereto. The first inner frame 150 is also a circular frame. As the length of the circumferential surface of the first inner frame 150 is formed to be the same as that of the outer circumferential surface of the seating part 130 and the first outer frame 140 is integrated with the outer circumferential surface of the seating part 130, the second inner frame 320 of the filter housing, which will be described later, may be coupled thereto.

The first auxiliary tab 141 configured for the coupling of the second outer frame 310 of the filter housing part 300 to be described below may be disposed on one side of the first outer frame 140. In more detail, the first auxiliary tab 141 protrudes upward from one side of the first outer frame 140, and a depression is formed on the inner surface of the first auxiliary tab 141. The first auxiliary tab 141 may be disposed such that a first auxiliary protrusion 311 formed on the outer circumferential surface of the second outer frame 310 is inserted thereinto. By this, the filter housing part 300 may be fixed to the stand connection portion 120.

The main tab 142 configured for the coupling of the second outer frame 310 of the filter housing part 300 to be described below may be disposed on the other side of the first outer frame 140. In more detail, the main tab 142 protrudes upward from one side of the first outer frame 140, and an opening is formed through the inner surface of the main tab 142. The main tab 142 may be disposed such that a main hook portion formed on the outer circumferential surface of the second outer frame 310 is inserted thereinto. By this, the filter housing part 300 may be fixed to the stand connection portion 120.

Second auxiliary tabs 151 for the coupling of the second inner frame 320 of the filter housing part 300 to be described later may be respectively disposed on the left and right sides (these are only definitions of directions, are not limitative, and means directions perpendicular to one side and the other side) of the first inner frame 150. In more detail, the second auxiliary tabs 151 protrude upward from the left and right sides of the first inner frame 150 and depressions are formed on the inner surfaces thereof. The second auxiliary tabs 151 may be disposed such that the second auxiliary protrusions 321 formed on both sides of the second inner frame 320 can be inserted thereinto. By this, the filter housing part 300 may be fixed to the stand connection portion 120.

The grill part 160 is a means that is disposed to be spaced apart at regular intervals in the circumferential direction between the first outer frame 140 and the first inner frame 150 and form holes 161 between the first outer frame 140 and the first inner frame 150. In more detail, the grill part 160 may be arranged in the form of a plurality of bars connecting between the inner circumferential surface of the first outer frame 140 and the outer circumferential surface of the first inner frame 150. The holes 161 may be formed by the spaces between the bars. Air may be introduced by the cooling system of the computer through the corresponding holes 161.

The stopper part 170 is a means that is disposed on the stand connection portion 120 and may fix the movement of the computer 10. In more detail, the stopper part 170 may be formed to protrude upward from the rear end of the stand connection portion 120. By this, the rear surface of the computer 10 is supported, so that it is possible to prevent the computer 10 from being removed rearward.

Referring to 10, the filter part 200 is a means that is coupled in such a manner that the filter housing part 300 is coupled to the cradle part 100 with the filter part 200 coupled to the filter housing part 300 and filters out the inflow of dust. In more detail, the filter part 200 may be formed by stacking a first filter part 210 for primarily blocking the inflow of dust and a second filter part 220 for secondarily blocking the inflow of dust. The first filter part 210 may be made of a mesh material for primarily filtering fine dust, and the second filter part 220 is a filter for preventing additional inflow and may be made of PVC.

The results of tests conducted for individual filter parts 200 after the computer 10 had been actually seated on the cradle device 1000 for the computer 10 are shown in FIGS. 10A-10G. Example is a structure in which the first filter part 210 and the second filter part 220 were stacked one on top of the other. Comparative Example 1 is a case where the filter part 200 was not applied. Comparative Example 2 is case where the first filter part 210 was used. Comparative Example 3 is a case where the filter efficiency was checked using the second filter part 220.

Referring to FIGS. 10A-10G, the results of device heat generation tests for individual filters and dust penetration tests for individual filters are described. These tests are reliability verification tests for the filter.

Purpose of device heat generation tests for individual filters is for review of possibility of reduction in air circulation and device heat generation due to the mass-produced filter when the maximum device fan speed is used. Test methods are as follows: 1. Prepare test programs: Cinebench (device overload), iStat Menus (heat generation graph), and Macs Fan Control (fan speed control). 2. Prepare stands mounted with the filters. 3. Run iStat Menus. 4. Start after running Cinebench (30 minutes/Dual Core required). 5. Check a CPU heat generation graph for each time span. Test conditions are as follows: Automatic fan speed/30 minutes/Dual Core/Normal environment. Test criteria are as follows: 1. Small temperature difference before and after the mounting of the stands (a maximum of 90° C.). 2. Optimum CPU temperature is 40-50° C. on average/70 to 80° C. for high-performance work.

Results of device heat generation tests for individual filters are as follows. Maximum heat generation temperature was a maximum of 70° C. with no stand, a maximum of 75° C. with conventional PVC type filter, a maximum of 76° C. (1st)/a maximum of 72° C. (2nd) with Mesh type filter, and a maximum of 78° C. (1st)/a maximum of 72° C. (2nd) with PVC+Mesh type filter. In conclusion, a temperature rise of 5° C. with conventional PVC type filter, a temperature rise of 2-8° C. within high-performance optimum temperature with Mesh type filter, and a temperature rise of 2-8° C. within high-performance optimum temperature with PVC+Mesh type filter.

Purpose of dust penetration tests for individual filters is for checking of the levels of dust clogging through actual use (long-term use) of the product/Use for reference when new specifications are reviewed. Test methods are as follows: 1. Introduce dust into the test box (Duck Down). 2. Fix maximum computer fan speed (RPM 3500). 3. Compare the inflows of dust into the filter parts. Test criteria are as follows: 1. Introduce dust into the test box (Duck Down). 2. Fix maximum computer fan speed (RPM 3500). 3. Compare the inflows of dust into the filter parts.

Results of dust penetration tests for individual filters are as follows. With no stand, device status is more than 90% dust inflow. With conventional PVC type filter, filter status is 98% or higher dust filtered out and device status is 2% fine dust inflow. With Mesh type filter, filter status is more than 100% dust stuck in filter and device status is no dust inflow. With PVC+Mesh type filter, filter status is more than 100% dust stuck in filter and device status is no dust inflow. In conclusion, conventional PVC type filter is effective against the inflow of dust. When the 250 mesh filter is applied, Mesh type filter is effective against the inflow of fine dust. When the PVC+250 mesh dual filter is applied, PVC+Mesh type filter is effective against the inflow of fine dust. With PVC+Mesh type filter, the fine dust filter is effective and deformation can be prevented.

As a result of the tests, heat generation occurred within the appropriate temperature range of 80 in all of Example and Comparative Examples. As a result of testing the dust inflow rate in the computer 10, 90% filtering efficiency was measured for Comparative Example 1, 98% filtering efficiency was measured for Comparative Example 2, less than 95% filtering efficiency was measured for Comparative Example 3, and 100% filtering efficiency was measured in Example. That is, it can be confirmed that, when the first filter part 210 and the second filter part 220 are stacked as in Example, the filtering efficiency is increased compared to Comparative Examples.

In addition, referring to FIG. 16, the filter part 200 is coupled to the top surface of the filter housing part 300 to be described later, more specifically the top surfaces of the second outer frame 310 and the second inner frame 320 of the filter housing part 300, so that it can be disposed between the cradle part 100 and the filter housing part 300 without being exposed to the outside. In more detail, the filter part 200 may be fabricated in a shape corresponding to the shape of the filter opening formed in the filter housing part 300, and may be coupled in such a way that it is attached to the top surfaces of the second outer frame 310, the second inner frame 320, and reinforcing portions 330.

Referring to FIGS. 11 to 19, the filter housing part 300 is a means that is selectively coupled to the cradle part 100 in a state in which the filter has been coupled and provides a passage through which air passes through the filter part 200. In more detail, the filter housing part 300 may include: a second outer frame 310 formed in a ring shape and forming an outer circumferential surface; a second inner frame 320 forming an inner circumferential surface; the reinforcing portions 330 disposed to connect between the second outer frame 310 and the second inner frame 320, and configured to increase durability and form a filter opening through which a filter is coupled; and the main hook portion 340 formed in the shape of a hook 341 for coupling to the cradle part 100.

The second outer frame 310 is a means constituting the outer circumferential surface of the filter housing part, and may have an annular frame shape having a circumference corresponding to the circumference of the first outer frame 140. In more detail, the second outer frame 310 may be selectively coupled to the first outer frame 140 of the stand connection portion 120. In this case, a first auxiliary protrusion 311 may be formed on one side of the outer circumferential surface of the second outer frame 310, and may be coupled to the first auxiliary tab 141 formed on the first outer frame 140. By this, the filter housing part 300 may be supported and fixed onto the stand connection portion 120.

Furthermore, a first insertion groove 312 may be formed on the inner side of the top surface of the second outer frame 310 along the direction in which the first inner frame 150 extends. The first insertion groove 312 is a means for providing a space for coupling of the outer circumferential surface of the filter part 200, and is formed for the stable coupling of the filter part 200.

The second inner frame 320 is a means constituting the inner circumferential surface of the filter housing, and may have a ring-shaped frame shape that is smaller than the second outer frame 310 and has a circumference corresponding to the first inner frame 150. In more detail, the second inner frame 320 may be selectively coupled to the first inner frame 150 of the stand connection portion 120. In this case, the second auxiliary protrusions 321 may be formed on both sides of the outer circumferential surface of the second inner frame 320, and may be coupled to the second auxiliary tabs 151 formed on the first inner frame 150. By this, the filter housing part 300 may be supported and fixed onto the stand connection portion 120.

In addition, the second insertion groove 322 may be formed on the outer side of the upper surface of the second inner frame 320 along the direction in which the second inner frame 320 extends. The second insertion groove 322 is a means for providing a space for the coupling of the inner circumferential surface of the filter part 200, and is formed for the stable coupling of the filter part 200.

The reinforcing portions 330 are formed in bar shapes connecting the inner circumferential surface of the second outer frame 310 and the outer circumferential surface of the second inner frame 320 to each other, and are means for providing a filter opening through which the filter part 200 is coupled. In more detail, the filter part 200 is coupled in the state in which the outer circumferential surface thereof is seated in the first insertion groove 312 formed in the second outer frame 310 and the inner circumferential surface thereof is seated in the second insertion groove 322 formed in the second inner frame 320. In this case, as the filter part 200 is supported on the top surfaces of the reinforcement portions 330 for the stable support of the filter part 200, there are effects in that stable coupling is possible and durability is improved when the filter housing part 300 is detached.

The main hook portion 340 is a means that is disposed on the other side of the outer circumferential surface of the second outer frame 310 and is inserted into the main tab 142 of the stand connection portion 120. In more detail, the main hook portion 340 includes: a hook 341 having elasticity so that a user can bend it laterally and extending downward; and a main protrusion 342 protruding outward from the outer circumferential surface of the hook 341 and configured to be fitted into the main tab 142 formed on the first outer frame 140 of the stand connection portion 120 upon coupling.

Accordingly, when a user desires to fixedly couple the filter housing part 300 to the stand connection portion 120, the user may couple the filter housing part 300 to the stand connection portion 120 by coupling the first auxiliary protrusion 311 formed on one side of the second outer frame 310 to the first auxiliary tab 141 formed on the first outer frame 140 of the stand connection portion 120 and then fitting and coupling the main protrusion 342 to the main tab 142 formed on the first outer frame 140 of the stand connection portion 120 in a state in which the hook 341 has been bent inward. In this case, the second auxiliary protrusions 321 formed on both sides of the second inner frame 320 are also coupled to the second auxiliary tabs 151 formed in the first inner frame 150. Through this, a complete fixed coupling is achieved.

The non-slip part 400 is configured to be attached to the top surface of the seating part 130 of the holding portion 100 in the form of a ring extending along the outer circumferential surface, and may be made of a material having a high friction coefficient, such as silicon. Due to this, when the bottom surface of the computer 10 is seated on the seating part 130, the outer circumferential surface of the bottom surface may come into contact with the non-slip part 400, and thus the movement of the computer 10 may be fixed.

The cradle device 1000 for the computer 10 according to the embodiment of the present invention described above has the following effects:

Although the shape is limited to the computer 10 released by a specific brand, there is the effect of completely preventing dust from entering the inside while the cooling system of the computer 10 operates.

Furthermore, the computer 10 may be seated on a desk or at a desired location in a state of being spaced apart from the ground by a set height, so that there is the effect of preventing abrasions or scratches on a main area while revealing the appearance of the computer 10 to the outside.

Furthermore, the filter part 200 is attached to the top surface of the filter housing part 300, and thus structuring is performed to minimize the exposure of the filter part 200 to the outside and also facilitate the coupling of the filter part 200, so that there is the effect of reducing the time and cost required in the manufacturing process.

Furthermore, the filter part 200 is constructed by stacking two types of filters, the first filter part 210 and the second filter part 220, so that there is the effect of filtering out both fine dust and large-sized foreign substances, resulting in the effect of increasing the durability of the computer 10 so that it can be used stably.

Moreover, the filter housing part 300 is disposed to be selectively coupled to the cradle part 100, and thus the filter housing part 300 may be removed from the cradle part 100 and also the coupled filter part 200 may be washed after the elapse of a predetermined period of time, so that there is the effect of economically using the filter part 200 for a long period of time.

So far, the present invention has been discussed with a focus on the preferred embodiments. It can be appreciated by those of ordinary skill in the art to which the present invention pertains that the present invention may be implemented in modified forms without departing from the essential features of the present invention. Therefore, the disclosed embodiments should be taken into consideration from an illustrative point of view rather than a limitative point of view. The scope of the present invention is defined by the claims rather than the foregoing description, and all differences falling within the equivalent range should be construed as being included in the present invention.

What is claimed is:

1. A cradle device for a computer in which a body part formed in a box shape and having a control unit and a cooling unit disposed therein and an inlet part protruding from a bottom surface of the body part in a circular shape, formed in a ring shape and configured to receive air introduced by the cooling unit are formed, the cradle device comprising:
    a cradle part configured such that the inlet part is seated thereon and holes through which air flows are formed therein;
    a filter part configured to filter out foreign substances generated according to the flow of air; and
    a filter housing part configured such that the filter part is coupled to a top surface thereof, and fixedly coupled below the holes of the cradle part;
    wherein the cradle part includes:
    one or more stand portions extending upward from a ground;
    a plate-shaped stand connection portion connecting the stand portions, and having a circular opening formed in a center thereof;
    a circular seating part disposed in a center of the stand connection portion and configured such that the computer is seated thereon;
    a first outer frame formed in a ring shape having a length of an outer circumferential surface equal to a length of an inner circumferential surface of the circular opening, and configured such that a first auxiliary tab protruding upward and having a depression formed in an inner circumferential surface is formed on one side and a main tab protruding upward and having an opening formed in an inner circumferential surface is formed on the other side; and
    a first inner frame formed in a ring shape having a length of an outer circumferential surface equal to a length of an outer circumferential surface of the seating part;
    wherein the filter housing part includes:
    a second outer frame coupled to the first outer frame, formed in a ring shape having a circumference corresponding to a circumference of the first outer frame, and configured such that a first auxiliary protrusion is formed on one side of an outer circumferential surface thereof and a main hook portion is formed on the other side of the outer circumferential surface thereof;
    a second inner frame coupled to the first inner frame, formed in a ring shape having a circumference corresponding to a circumference of the first inner frame, and disposed below the second outer frame; and
    reinforcing portions having a plurality of bar shapes connecting the second outer frame and the second inner frame;
    wherein the main hook portion includes a hook having elasticity so that a user can bend it laterally and extending downward and a main protrusion protruding outward from an outer circumferential surface of the hook;
    wherein a user bends the hook and then inserts the main protrusion into the main tab in a state of coupling the first auxiliary protrusion to the first auxiliary tab, so that the main hook portion is coupled to the main groove and the filter housing part is coupled to the cradle part; and
    wherein the filter part is coupled into spaces between the reinforcing portions, and filters out foreign substances through the filter part before air is introduced into the inlet part.

2. The cradle device of claim 1, wherein:
    the cradle part includes a grill part having a plurality of bar shapes connecting the first outer frame and the first inner frame;
    a direction from the first outer frame to the first inner frame is disposed to be inclined downward; and
    the holes are formed by spaces of the grill part.

3. The cradle device of claim 1, wherein the filter part includes one or more of:
    a first filter part made of mesh material; and
    a second filter part made of a PVC material, and formed to be stacked together with the filter part.

* * * * *